United States Patent
Wang et al.

(10) Patent No.: US 11,541,764 B2
(45) Date of Patent: Jan. 3, 2023

(54) SYSTEMS AND METHODS FOR CONTROLLING MOTOR ENGAGEMENT FOR A VEHICLE

(71) Applicant: Rivian IP Holdings, LLC, Plymouth, MI (US)

(72) Inventors: Kang Wang, Palos Verdes Estates, CA (US); Boru Wang, Torrance, CA (US); Steve Schulz, Torrance, CA (US); Chia-Chou Yeh, Torrance, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 158 days.

(21) Appl. No.: 17/164,381

(22) Filed: Feb. 1, 2021

(65) Prior Publication Data
US 2022/0242252 A1  Aug. 4, 2022

(51) Int. Cl.
*B60L 15/20* (2006.01)
(52) U.S. Cl.
CPC ..... *B60L 15/2054* (2013.01); *B60L 2240/421* (2013.01); *B60L 2240/423* (2013.01); *B60L 2260/40* (2013.01); *B60L 2260/42* (2013.01)
(58) Field of Classification Search
CPC ........... B60L 15/2054; B60L 2240/421; B60L 2260/40; B60L 2240/42; B60L 2260/42
See application file for complete search history.

(56) References Cited

U.S. PATENT DOCUMENTS

2018/0050609 A1* 2/2018 Meyer .................... B60L 50/61
2019/0389317 A1* 12/2019 Oh ......................... B60L 15/20

FOREIGN PATENT DOCUMENTS

CN  109070763 A * 12/2018 ............. B60L 15/20

OTHER PUBLICATIONS

Lee, S-C. et al., "Implementing Advanced AC Drive Controls Using Auto-Coding Methods," 18th International Conference on Electrical Machines and Systems (ICEMS), 1307-1313 (Oct. 2015).
Lorenz, R.D., et al., "Motion Control with Induction Motors," Proceedings of the IEEE, 82(8): 1215-1240 (Aug. 1994).
Tzou, Y-Y, "DSP-Based Robust Controll of an AC Induction Servo Drive for Motion Control," IEEE Transactions on Control Systems Technology, 4(6):614-626 (Nov. 1996).

* cited by examiner

*Primary Examiner* — Justin Holmes
(74) *Attorney, Agent, or Firm* — Haley Guiliano LLP

(57) ABSTRACT

A system is configured to manage motor engagement in a vehicle by determining to engage a disengaged motor shaft with a drivetrain, and in response, activating a feedback controller based on a speed of the motor shaft and activating a feedforward controller. The system determines at least one metric for modifying an output of the feedforward controller. The at least one metric is based on the speed of the motor shaft and the desired speed, and may be applied as a gain to the output of the feedforward controller. The system generates a command based on the feedback controller, the feedforward controller, and the at least one metric, and causes the motor shaft and the drivetrain to be engaged based on the speed of the motor shaft and the desired speed. The system nulls output of the feedforward controller as the speed of the motor shaft approaches the desired speed.

20 Claims, 8 Drawing Sheets

SYSTEMS AND METHODS FOR CONTROLLING MOTOR ENGAGEMENT FOR A VEHICLE

INTRODUCTION

The present disclosure is directed towards speed controllers for a vehicle motor, and more particularly towards feedback and feedforward controllers for engaging vehicle motors.

SUMMARY

In some embodiments, the present disclosure is directed to a method for managing motor engagement in a vehicle. The method includes determining to engage a disengaged motor shaft with a drivetrain, and in response, activating a feedback controller based on a speed of the motor shaft and activating a feedforward controller. The method includes determining at least one metric for modifying an output of the feedforward controller. The at least one metric is based on the speed of the motor shaft and the desired speed. The method includes generating a resulting motor command based on the feedback controller, the feedforward controller, and the at least one metric. The method includes causing the motor shaft and the drivetrain to be engaged based on the speed of the motor shaft and the desired speed. The method includes nulling the feedforward controller, the at least one metric, or both, based on the speed of the motor shaft and the desired speed.

In some embodiments, the at least one metric includes an index ranging from an initial value to a zero value. In some such embodiments, the at least one metric decreases in value from the initial value to the zero value as the speed of the motor shaft approaches the desired speed within a predetermined range. In some embodiments, the at least one metric includes one of a constant value or a zero value. The at least one metric includes the constant value while the difference between the speed of the motor shaft and the desired speed is greater than a reference value, and the zero value when the difference between the speed of the motor shaft and the desired speed is less than the reference value.

In some embodiments, causing the motor shaft and the drivetrain to be engaged includes at least one of determining a difference between the speed of the motor shaft and the desired speed and comparing the difference to a reference difference, or comparing the speed of the motor shaft to a predetermined value, wherein the predetermined value is based on the desired speed.

In some embodiments, the method includes modifying the feedback controller to increase command tracking bandwidth after causing the motor shaft and the drivetrain to be engaged.

In some embodiments, generating the resulting torque command includes modifying an output of the feedforward controller using the at least one metric to generate a modified signal, and combining the modified signal with an output of the feedback controller to generate the resulting motor command.

In some embodiments, generating the resulting motor command includes applying the at least one metric as a gain to the output of the feedforward controller.

In some embodiments, nulling at least one of the feedforward controller or the at least one metric includes determining a difference between the speed of the motor and the desired speed, comparing the difference to a reference value, and causing the at least one metric to achieve a value of zero.

In some embodiments, the present disclosure is directed to a system that includes a drivetrain having at least one wheel of a vehicle, a motor having a motor shaft and configured to be engaged with the drivetrain, and control circuitry. The control circuitry is configured to determine to engage the motor shaft and the drivetrain, and in response, activate a feedback controller based on a speed of the motor shaft and activate a feedforward controller. The control circuitry is configured to determine at least one metric for modifying an output of the feedforward controller. The at least one metric is based on the speed of the motor shaft and the desired speed. The control circuitry is configured to generate a resulting motor command based on the feedback controller, the feedforward controller, and the at least one metric. The control circuitry is configured to cause the motor shaft and the drivetrain to be engaged based on the speed of the motor shaft and the desired speed. For example, the system may cause a clutch to be engaged to couple the motor to the drivetrain. The control circuitry is configured to null the feedforward controller, the at least one metric, or both, based on the speed of the motor shaft and the desired speed. In some embodiments, the system includes a sensor system coupled to the control circuitry and configured to sense position information corresponding to the motor shaft. In some embodiments, the system includes a power electronics system such as a motor driver for managing current flow in phases of the motor based on a control signal.

In some embodiments, the present disclosure is directed to a method for managing engagement of a motor in a vehicle by modifying a feedback controller. The method includes executing a feedback speed controller based on a speed of the motor shaft, and executing a feedforward torque controller based on a desired speed and the speed of the motor shaft. The method includes causing the motor shaft and the drivetrain to be engaged based on a first threshold and speed of the motor shaft. The method includes nulling the feedforward torque controller based on a first threshold and speed of the motor shaft, and modifying the feedback speed controller after the speed of the motor shaft and the desired speed are within the predetermined range. For example, when the motor shaft is within a threshold of the desired speed, the motor shaft and the drivetrain may be engaged, the feedforward controller may be nulled, and the feedback controller may be modified. In some embodiments, the method includes generating a control signal based on output of the feedback controller and based on the feedforward controller, and causing a current to be generated in the motor based on the control signal. In some embodiments, modifying the feedback controller includes adjusting one or more constants of a proportional-integral-derivative (PID) controller.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to electric vehicle systems having more than one electric motor that are engageable. For example, rather than connecting all motors to a drivetrain all the time (e.g., even if the motor is not used for torque generation), motors may be engaged with the drivetrain as needed. In some embodiments, allowing motors to be disengaged/engaged may avoid or limit losses, and thus avoid reducing electric vehicle drive range.

Figure 1:
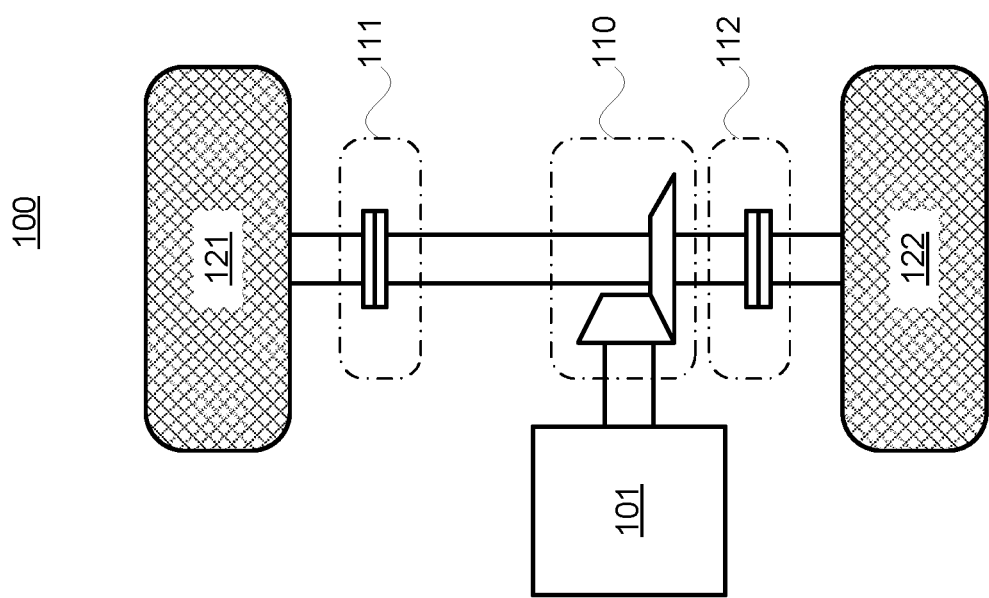
FIG. 1 shows a system diagram of an illustrative, engageable drivetrain, in accordance with some embodiments of the present disclosure.

FIG. 1 shows a system diagram of illustrative, engageable drivetrain 100, in accordance with some embodiments of the present disclosure. As illustrated, engageable drivetrain 100 includes electric motor 101, gearset 110, engagement interfaces 111 and 112, and wheels 121 and 122. Although labeled separately, gearset 110 and engagement interfaces 111 and 112 may be combined as a single assembly having any suitable components (e.g., clutches, gear reductions, pulleys, bearings, lubrication systems, shafts, joints, suspension, brakes, controls) and any number of engagement interfaces (e.g., one, two, or more than two). In some embodiments, for example, a vehicle may include front wheels and rear wheels, and may engage the front wheels, rear wheels, or both, as needed. For example, wheels 121 and 122 may be either front or rear wheels, and if increased torque is desired, the system may determine to engage electric motor 101 via gearset 110 by activating engagement interfaces 111 and 112, which may include clutches for example. Because the vehicle may be moving already, the system may accelerate electric motor 101 before activating engagement interfaces 111 and 112 to prevent or otherwise lessen interaction torques (e.g., from a difference in speed of mating components). In some embodiments, although not illustrated in FIG. 1, each wheel of a vehicle may correspond to a respective motor, and each motor may be engageable/dis-engageable with the respective wheel. Thus, one or several motors can be detached from a gearbox and/or interface when not being used for providing torque.

Figure 2:
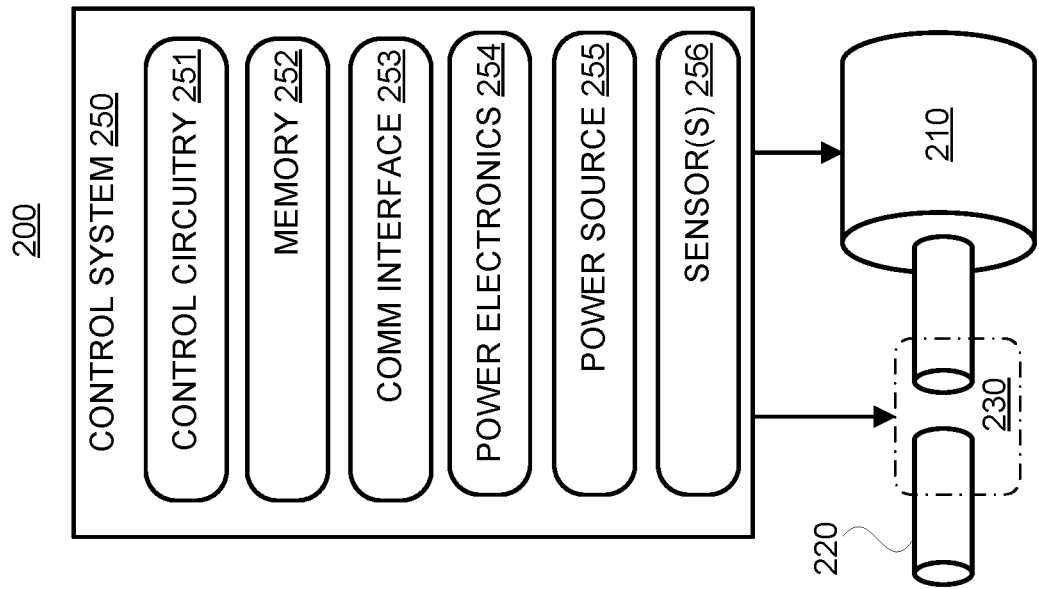
FIG. 2 shows a system diagram of an illustrative engageable motor and load, in accordance with some embodiments of the present disclosure.

FIG. 2 shows a system diagram of illustrative motor 210 and load 220, in accordance with some embodiments of the present disclosure. As illustrated, system 200 includes control system 250, motor 210, load 220, and interface 230. Control system 250, as illustrated, includes control circuitry 251, memory 252, communications (COMM) interface 253, power electronics 254, power source 255, and one or more sensors 256, and may include any other suitable components, or a combination thereof. In an illustrative example, control system 250 may be used to engage and disengage wheels 121 and 122 from motor 101 in FIG. 1 (e.g., interface 230 may include or correspond to engageable interfaces 111 and/or 112).

Control system 250 includes control circuitry configured for controlling operation of motor 210. Control circuitry 251 may include a processor such as, for example, a central processing unit having a single core or dual core, bus, logic circuitry, integrated circuitry, digital signal processor, graphics processor, embedded processing device, any other suitable components for reading and executing computer instructions, or any combination thereof Memory 252 may include any suitable storage device such as, for example, volatile memory, non-volatile memory, a removable storage device, a solid state storage device, an optical device, a magnetic device, any other suitable component for storing and recalling information, or any combination thereof. COMM interface 253 may include electrical terminals, level shifters, a communications module, connectors, cables, antennas, any other suitable components for transmitting and receiving information, or any combination thereof. For example, COMM interface 253 may include an ethernet interface, a WiFi interface, an optical interface, a sensor interface (e.g., for interacting with one or more sensors 256), any other suitable wired or wireless interface, or any combination thereof. To illustrate, COMM interface 253 may include a sensor interface having a power supply, analog-to-digital converter, digital-to-analog converter, signal processing equipment, signal conditioning equipment, connectors, electrical terminals, any other suitable components for managing signals to and from a sensor, or any combination thereof. To illustrate further, a sensor interface may be configured to communicate with a current sensor, a position sensor (e.g., a rotary encoder coupled to the motor shaft or gear shaft), a temperature sensor, a voltage sensor, an accelerometer (e.g., a vibration sensor), any other suitable sensor of sensor(s) 256, or any combination thereof. In some embodiments, COMM interface 253 is configured to transmit a control signal indicative of a motor command to power electronics 254. Power electronics 254 may include a motor drive, switches (e.g., IGBTs, MOSFETs), diodes (e.g., flyback diodes), one or more buses (e.g., a DC bus), any other suitable components, arranged in any suitable configuration (e.g., an H-bridge, a half-bridge), or any combination thereof. Power source 255 may include a battery, a battery system, leads coupled to a battery system, or a combination thereof, for providing electric power to control circuitry 251, memory 252, COMM interface 253, power electronics 254, one or more sensors 256, motor 210, interface 230, any other suitable components, or any combination thereof.

In some embodiments, control system 250 is configured to control engagement at interface 230. For example, interface 230 may include a clutch controlled (e.g., engaged, disengaged) by control system 250. In a further example, interface 230 may include one or more actuators (e.g., electric motors, solenoids), mechanical actuators, hydraulic actuators, pneumatic actuators, sensors (e.g., speed sensors, load sensors, vibration sensors, optical sensors, limit switches), any other suitable components for managing engagement of motor 210 and load 220, or any combination thereof. In some embodiments, interface 230 may include gearset 110, and engagement interfaces 111 and 112 of FIG. 1, for example.

In an illustrative example, control system 250 may be configured to control motor 210. In some embodiments, motor 210 includes phases, corresponding to windings, that are coupled via phase leads to power electronics 254. In some such embodiments, power electronics 254 are configured to receive control signals from control circuitry 251. Control circuitry 251 may be configured to implement a motor control algorithm, based on computer instructions stored in memory 252, that generates the control signal based on one or more inputs. For example, control circuitry 251 may be configured to implement a control scheme for generating a current command based on a desired performance (e.g., a desired motor position, speed, acceleration, torque, flux, or a combination thereof), and may generate a control signal indicative of the current command. To illustrate, the control signal may include a pulse-width modulated (PWM) signal, a pulse-density modulated (PDM) signal, an analog signal, a digital signal (e.g., via serial or parallel interface), any other suitable signal type, or any combination thereof.

In an illustrative example, control system 250 (e.g., or control circuitry 251 thereof) may be configured to execute a motor control algorithm for engaging and disengaging, via interface 230, motor 210 from load 220. For example, system 200 may be included in an electric vehicle, wherein load 220 corresponds to a drivetrain or a portion thereof. When more torque is needed to propel the vehicle, motor 210 (e.g., which may be initially disconnected from load 220) can be attached to load 220 (e.g., a gearbox) by engaging interface 230. During the engagement of motor 210 and load 220, large interactive torques may arise that can reduce the lifetime of components (e.g., motor 210, a gearbox of load 220, or a clutch of interface 230), damage components, or a combination thereof. In some embodiments, control system 250 (e.g., or control circuitry 251 thereof) may be configured to achieve a softer engagement between motor 210 and load 220, exhibit a fast acceleration rate, or both. In some embodiments, the present disclosure is directed to a motor controller (e.g., a speed controller) configured to achieve a relatively small or reduced interactive torque during the engagement or disengagement of interface 230.

Figure 3:
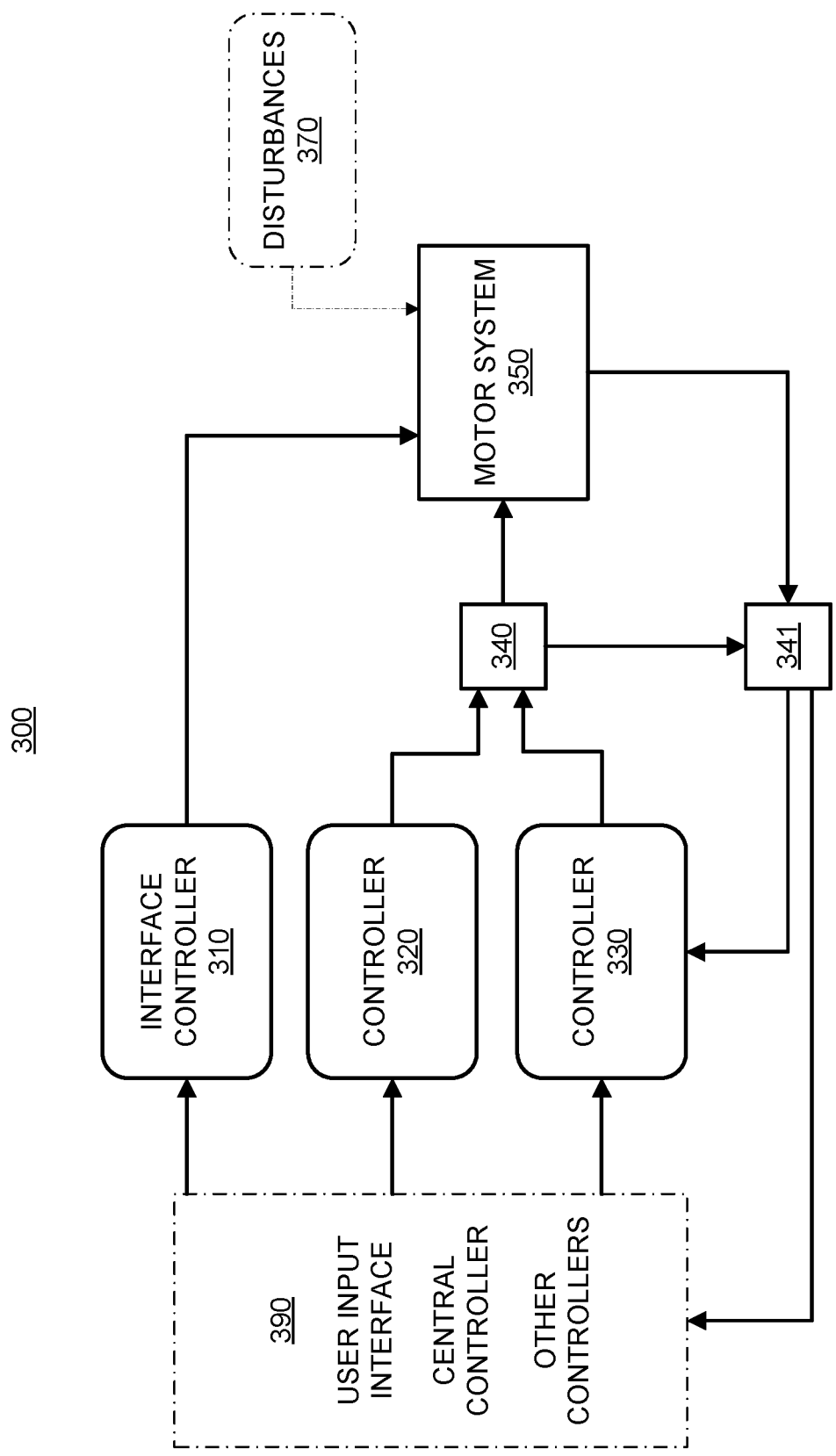
FIG. 3 shows a block diagram of an illustrative system for managing engagement of a motor and a load using two controllers, in accordance with some embodiments of the present disclosure.

FIG. 3 shows a block diagram of illustrative system 300 for managing engagement of a motor and a load using two controllers, in accordance with some embodiments of the present disclosure. In some embodiments, system 300 may be included in, or may include, system 200 of FIG. 2, or any aspects thereof. As illustrated, system 300 includes interface controller 310, controller 320, controller 330, signal generator 340, motor system 350, and sensor interface 341. Further inputs 390, which may include inputs from an input interface, central controller, or any other suitable controller or interface, may be provided to any or all of interface controller 310, controller 320, and controller 330. Motor system 350 includes, for example, a motor drive (e.g., power electronics for controlling current in phases of an electric motor), an electric motor, a motor-load interface (e.g., a clutch or other device for engaging and disengaging), optionally a gearbox, any other suitable components, or any combination thereof. Motor system 350 is configured to engage and disengage a motor from a load (e.g., an electric motor from a drivetrain of an electric vehicle). Controllers 320 and 330 are configured to control speed, torque, or both of the motor by generating a control signal indicative of a desired current in phases of the electric motor. Controller 330 is configured to receive feedback from motor system 350 to aid in controlling operation of the motor (e.g., to reduce error, increase stability, prevent undesired operation, detect faults, improve bandwidth capability, or a combination thereof). In an illustrative example, interface controller 310, controller 320, and controller 330 may be implemented in hardware, software, or both (e.g., as part of control circuitry 251, instructions stored in memory 252, or both of FIG. 2).

Interface controller 310 is configured to control engagement and disengagement of an electric motor and a load of motor system 350. In some embodiments, interface controller 310 may receive an indication from any of inputs 390 to engage (or disengage) an electric motor from a load of motor system 350. For example, a central controller may determine that additional torque is needed for vehicle operation and generate an indication to interface controller 310 to engage the electric motor and the drivetrain. Accordingly, the central controller may also provide an indication to controller 320 and controller 330 to spool up the electric motor to reduce interaction torque between the electric motor and the load during engagement (e.g., from differences in speed at engagement). To illustrate, the central controller may determine to engage the electric motor and drivetrain, and provide an indication to controllers 320 and 330 to speed up the electric motor to match speed with the drivetrain shaft prior to engagement of the electric motor and the load. In some embodiments, the present disclosure is directed to systems and methods to manage the spool-up process to reduce the interaction torque.

In some embodiments, controller 330 may include a feedback controller for controlling an electric motor of motor system 350. For example, controller 330 may include a proportional-integral-derivative (PID) controller configure to control an angular position, angular speed, or both, of an electric motor. In a further example, controller 330 may be configured to receive sampled sensor information from sensor interface 341 such as position information (e.g., from a rotary encoder, magnetic encoder, optical encoder, or any other suitable sensor), current information (e.g., from a current sensor of one or more phases of the electric motor of motor system 350), voltage information, any other suitable sensor information, or any combination thereof. In some embodiments, controller 330 may be configured to be stiff enough to reject a disturbance torque (e.g., from disturbance 370). In some embodiments, the stiffness of controller 330 may be lessened during the engagement process and spool up to prevent overshoot in speed due to latency in controller 330. Sensor interface 341 may be configured to provide a sensor signal to interface controller 310, inputs 390 (e.g., a controller thereof), controller 330, controller 320 (e.g., to determine when to activate or de-activate a feedforward controller), or a combination thereof. Sensor interface 341 may include an encoder for sensing position information of a motor of motor system 350, one or more current sensors (e.g., for measuring DC bus or phase current to a motor), a voltage sensor, an optical or image-based sensor, any other suitable sensor system, or any combination thereof. In an illustrative example, information from sensor interface 341 may be stored in memory, used for feedback control, used with a feedforward controller (e.g., to modify or enable a feedforward controller), used to determine an input or desired value, used for fault detection, or a combination thereof. In some embodiments, information from sensor interface 341 is used to update one or more controllers (e.g., parameters of inputs 390, controllers 320 and 330, and interface controller 310), update a desired or input value, determine a metric for modifying the output of controller 320, determining a modification to controller 330, or a combination thereof. For example, position information and current information from sensor interface 341 may be used to determine or check an inertia metric (e.g., a moment of inertia), friction coefficient, or other metric used in processes of system 300 (e.g., as described in the context of process 900 of FIG. 9).

In some embodiments, controller 330 may include a feedforward controller for controlling an electric motor of motor system 350. For example, because the engagement of the electric motor and drivetrain is indicated and thus may be predicted, controller 320 may apply a model of the impending engagement by providing a feedforward response. For example, an increase in speed command may be provided to controller 330. The addition of output from controller 320 to the output from controller 330 may improve the bandwidth and response time of the motor speed to match the load by supplying an additional torque (or current) command to that determined by controller 330 based on feedback from sensor interface 341. Accordingly, controller 320 may compensate for a reduced stiffness in controller 330 to reach a desired position or speed without overshoot or latency. In an illustrative example, the feedback control of controller 330 provides stable control of the electric motor, while the feedforward control of controller 320 improves response time and bandwidth for the spool-up process so the motor shaft of the electric motor may accelerate more quickly.

Figure 4:
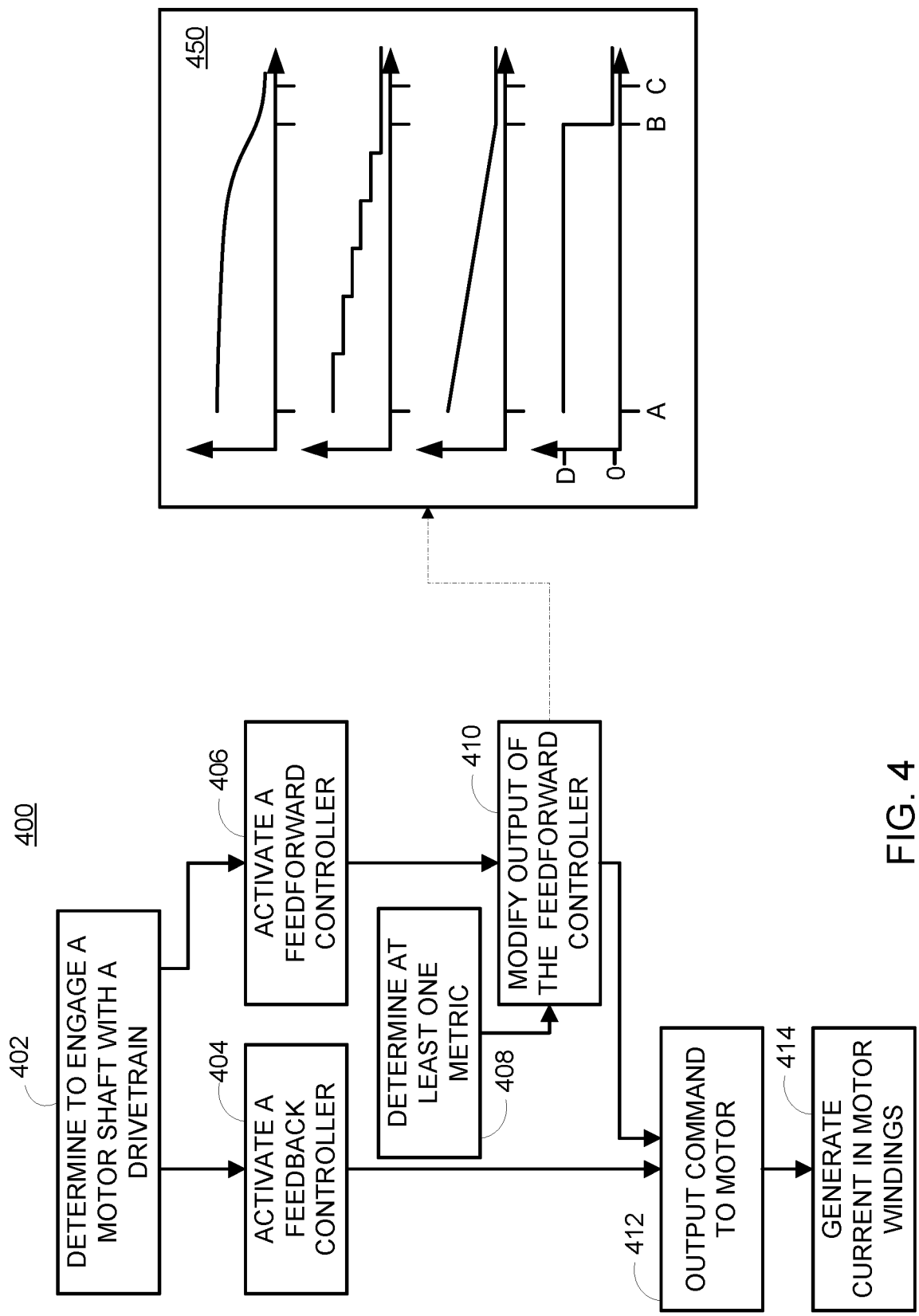
FIG. 4 shows a flowchart of an illustrative process for managing engagement of a motor and a load using two controllers, in accordance with some embodiments of the present disclosure.

FIG. 4 shows a flowchart of illustrative process 400 for managing engagement of a motor and a load using two controllers, in accordance with some embodiments of the present disclosure. Illustrative process 400 may be implemented by, for example, control system 250 of FIG. 2 (e.g., or any aspects thereof), system 300 of FIG. 3 (e.g., or any aspects thereof), any other suitable system for executing computer instructions and generating a control signal (e.g., a current command), or any combination thereof. In an illustrative example, process 400 may be implemented to occur within one second or less to provide fast response in engaging an electric motor.

At step 402, the system determines to engage a motor shaft with a drivetrain. In some embodiments, the system may receive an indication to engage the motor shaft, and may determine to engage the motor shaft based on the indication. For example, the indication may be received from an input interface, a controller, any other suitable source, or any combination thereof (e.g., as illustrated by inputs 390 of FIG. 3). In some embodiments, the system may determine to engage the motor shaft based on an instruction of stored computer instructions (e.g., in memory 252 of FIG. 2). For example, the system may determine a desired torque value, and may determine to engage the electric motor to provide at least some portion of the desired torque. In a further example, a vehicle drivetrain may include more than one electric motor, and accordingly may determine whether to engage each of the more than one motors to provide a desired torque. The system may determine to engage the motor shaft with the drivetrain based on an indication (e.g., provided by an input interface or controller), a measured or sensed value (e.g., current above a threshold in phases of an already-engaged motor to lessen that current), a threshold of torque or current referenced in computer instructions stored in memory of (or otherwise accessible to) the system, any other suitable criterion, or any combination thereof.

At step 404, the system activates a feedback controller. The feedback controller may include a PID control technique, or any other suitable control technique, for controlling an angular position, angular speed, or both, of the electric motor. In an illustrative example, the feedback controller may be, but need not be, the same as controller 330 of FIG. 3. In some embodiments, the system adjusts one or more coefficients, variables, or parameters of the feedback controller at step 404. For example, the feedback controller may be operating but with reduced or null coefficients, and the system may, at step 404, adjust the coefficients to provide PID control of the motor. In some embodiments, the feedback controller is not operating when the electric motor is disengaged and, at step 404, may be initiated by the system. For example, at step 404, the feedback controller may begin receiving sampled position information, sampled current information, or any other inputs, and may also begin generating an output such as a current command, a torque command, or a signal indicative thereof.

At step 406, the system activates a feedforward controller. The feedforward controller may include a torque controller, or any other suitable control technique, for generating a torque at the electric motor. In an illustrative example, the feedforward controller may be, but need not be, the same as controller 320 of FIG. 3. In some embodiments, the system adjusts one or more coefficients, variables, or parameters of the feedforward controller at step 406. For example, the feedforward controller may be operating but with reduced or null coefficients, and the system may, at step 406, adjust the coefficients to provide an output indictive of torque, current, or both. In some embodiments, the feedforward controller is not operating when the electric motor is disengaged and, at step 406, may be initiated by the system. For example, at step 406, the feedforward controller may begin outputting a current command, a torque command, or a signal indicative thereof. In some embodiments, for example, the feedforward controller is modeled based on an expected current or torque requirement to achieve the engagement. For example, because the motor will need to spool up, the feedforward controller may provide additional input to increase bandwidth of the transition, without being limited by latency of the feedback controller.

At step 408, the system determines at least one metric for modifying the output of the feedforward controller of step 406. In some embodiments, the metric may include a binary value such as, for example, numerical values (e.g., zero or one), flag values (e.g., enable, disable), state values (e.g., on, off), any other suitable pair of values, or any combination thereof. In some embodiments, the system determines the at least one metric at a particular time, during a particular time duration, or a combination thereof. In some embodiments, for example, the system may determine the at least one metric at the same time as activating the feedforward controller of step 406. In some embodiments, the system may determine the at least one metric at a predetermined frequency, in response to an event or events, in response to one or more parametric values, or otherwise more than once. For example, the system may update the at least one metric one or more times during the engagement process. In a further example, the system may update the at least one metric as the motor shaft speed approaches the desired speed (e.g., the speed of the load shaft) or otherwise accelerates or decelerates. In some embodiments, step 408 may be triggered based on the computer-implemented instructions. In some embodiments, the at least one metric may be retrieved from a database or other reference information stored in memory (e.g., memory 252 or external memory accessible using COMM interface 253).

At step 410, the system modifies the output of the feedforward controller based on the at least one metric of step 408. In some embodiments, the at least one metric of step 408 may be applied as a gain, wherein the at least one metric is multiplied with the output from the feedforward controller of step 406. In some embodiments, the at least one metric of step 408 may be applied as a switch, wherein output of the feedforward controller is propagated (e.g., a gain of one) or nulled (e.g., set to zero). In some embodiments, for example when the at least one metric is a flag or state value, the system may access a lookup table, database, or other reference information to determine how to modify the output of the feedforward controller. For example, the system may access reference information to determine by how much to modify the output of the feedforward controller, whether to modify the output of the feedforward controller, or both. As illustrated in panel 450, the modification may include a gain that may be a function (e.g., of time or index), a stepwise or otherwise piecewise function, a ramp, a constant, any other suitable shape, or any combination thereof, from a beginning point to an ending point. For example, referencing panel 450, the modification is initialized at A and deactivated at B, wherein the motor shaft speed achieves the desired speed at C. As illustrated, the modification achieves a first level D and transitions to a value of zero (e.g., nulling the output of the feedforward controller) at B.

In some embodiments, step 410 includes nulling the output of the feedforward controller. For example, the system may null the feedforward controller, null the at least one metric (e.g., wherein the at least one metric is applied as a gain to the output of the feedforward controller), or both. In some embodiments, the system nulls the output of the feedforward controller based on the speed of the motor shaft and the desired speed (e.g., a difference between the speed of the motor shaft and the desired speed). For example, as the speed of the motor shaft approaches the desired speed, the system may reduce or otherwise null the output of the feedforward controller. As used herein, "nulling" refers to causing to be negligible, insignificant, or significantly reduced in effect. For example, nulling may refer to setting a gain to zero or near to zero (e.g., rendering the resulting value to be insignificant). In a further example, nulling may refer to de-activating a signal such that it does not propagate (e.g., and thus cannot have an effect on the output). In a further example, nulling may refer to causing a value or effect to approach zero, or reach zero, such that it no longer has a significant impact on the output. To illustrate, the modifications of panel 450 are nulled at B or otherwise at C.

At step 412, the system outputs one or more commands to an electric motor. In some embodiments, step 412 includes combining the outputs from the feedback controller of step 404 and the modified (or unmodified) output of feedforward controller 406. For example, the outputs may be added as scalar values (e.g., total desired torque or total desired current), vector values (e.g., arrays of torque or current per motor, or per phase of each motor), matrices, any other suitable values, or any combination thereof. In some embodiments, the system applies a gain, an offset, a transformation, any other suitable operation, or any combination thereof, to generate an output signal at step 412. In some embodiments, the system may generate an output signal at step 412 such as, for example, an analog signal, a PWM signal, a digital signal, any other suitable signal for transmission via any suitable communications path, or any combination thereof. For example, the system may generate an output command indicative of a desired torque, desired current, or both, and may generate an output signal indicative of the output command for transmitting to a power electronics system (e.g., or control circuitry thereof). In some embodiments, the system may include a signal generator that is configured to take as input the output command and generate as output a signal for transmission that is indicative of the output command. In some embodiments, the system may latch the output such that a particular output continues to be transmitted until it is updated (e.g., by an iteration of the control algorithm or other determination of a new output command).

At step 414, the system generates current in one or more motor windings based on the one or more commands of step 412. In a further example, at step 412, the system may begin outputting a PWM signal to power electronics (e.g., any suitable power electronics system such as power electronics 254) to control current in one or more phases of the electric motor (e.g., electric motor 210) at step 414. In some embodiments, the power electronics system includes switches coupled to phases of the electric motor, wherein the switches are activated and deactivated to control current in the phases (e.g., and thus torque in the motor). For example, the power electronics system may include an inverter (e.g., coupled to a DC bus), a variable frequency drive (e.g., to generate sinusoidal or otherwise periodic waveforms), an H-bridge or half bridge, a DC bus, any other suitable components, or any combination thereof. For example, in some embodiments, the electric motor may include a switched reluctance motor (e.g., with any suitable number of phases and poles). In a further example, in some embodiments, the electric motor may include an AC motor (e.g., induction or synchronous, with any suitable number of phases and poles).

In an illustrative example, the feedback controller of step 404 may be designed to operate with a predetermined stiffness or bandwidth. For example, during the motor and gearbox engagement, if a feedback controller is too stiff, a large interactive torque between the motor and gearbox may be induced. The large interactive torque could damage the gearset, the clutch, or other aspects of the drivetrain. Accordingly, in some embodiments, the feedback controller includes a relatively high bandwidth, low stiffness speed controller. For example, the feedback controller may include self-adaptive variable speed controller gains. In a further example, the feedback controller may include coefficients corresponding to proportional, integral, and derivative control, and the system may adjust any or all coefficients of the PID controller.

In an illustrative example, the system may achieve speed overshoot reduction by applying an adjustable torque command feedforward index (e.g., as described in FIG. 5), a torque command feedforward enable/disable function (e.g., as described in FIG. 6), a speed dependent PID algorithm (e.g., as described in FIG. 7), any other suitable technique in accordance with the present disclosure, or any combination thereof. In some such embodiments, the system implements a controller design for engagement of an electric motor and gearbox that does not rely on a stiff feedback controller. For example, the feedback controller may be softened (e.g., made less stiff relatively), and the feedforward controller may be used to increase bandwidth while the motor shaft is accelerated (e.g., either positive or negative acceleration).

Accordingly, the system may provide a high bandwidth and soft control technique To illustrate, in some embodiments, this approach is opposite to traditional speed controllers that are relatively stiff. The implementation of process 400 may allow smooth engagement of the motor to the load, a fast acceleration rate, zero speed overshoot or otherwise a reduced speed overshoot, or a combination thereof.

In a further illustrative example, the electric motor may be connected to the gear box only when needed (e.g., for additional torque), thus providing powertrain control. Process 400 may allow the motor to be accelerated in a short time duration while allowing connection of the motor with the gearbox to occur softly to avoid or lessen damage, wear, or both. To illustrate, the engagement may occur over a duration that is less than one second (e.g., 500 ms or other relatively short time).

Figure 5:
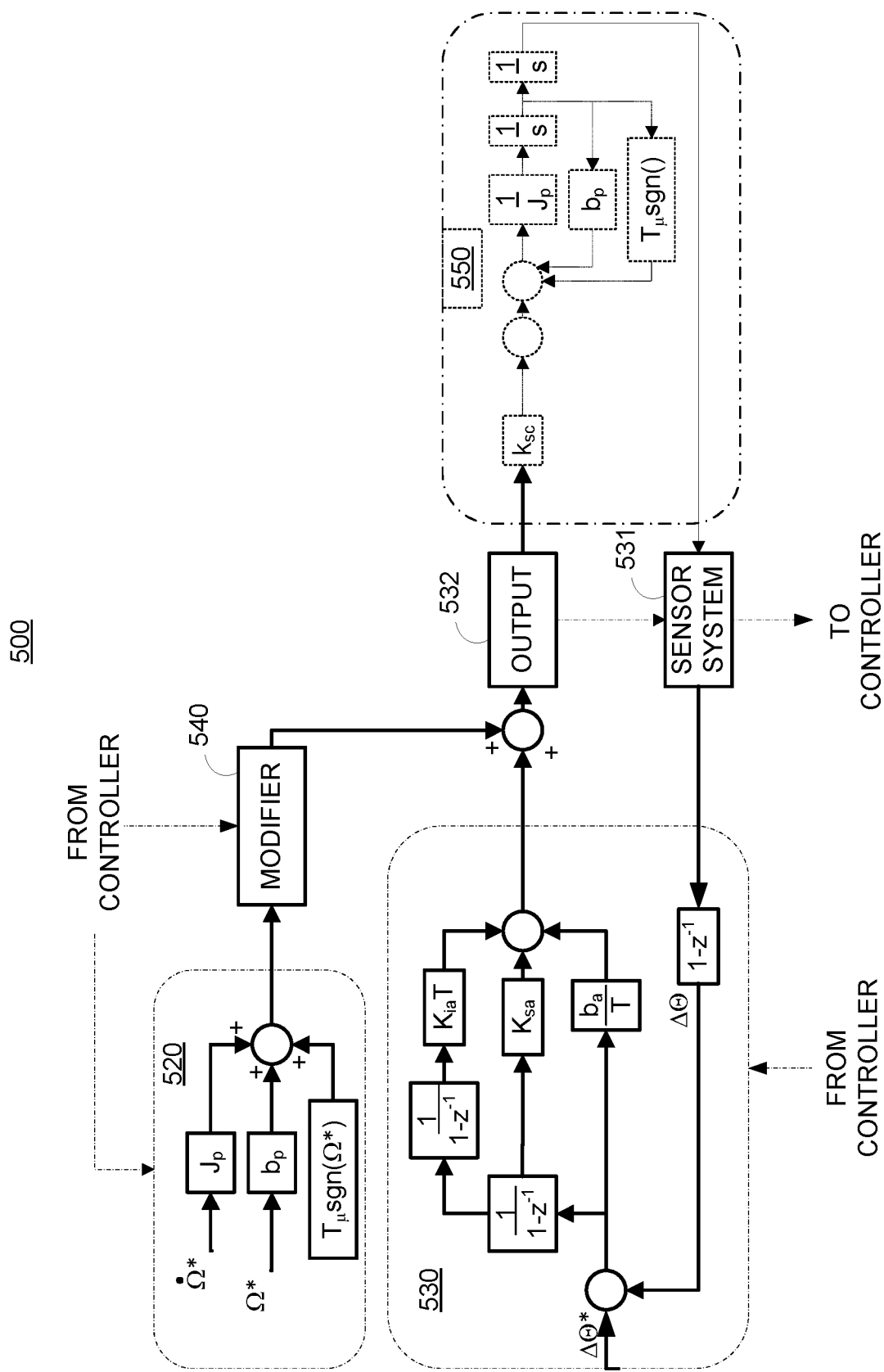
FIG. 5 shows a block diagram of an illustrative system for managing engagement of a motor and a load using an indexed feedforward controller, in accordance with some embodiments of the present disclosure.
Figure 6:
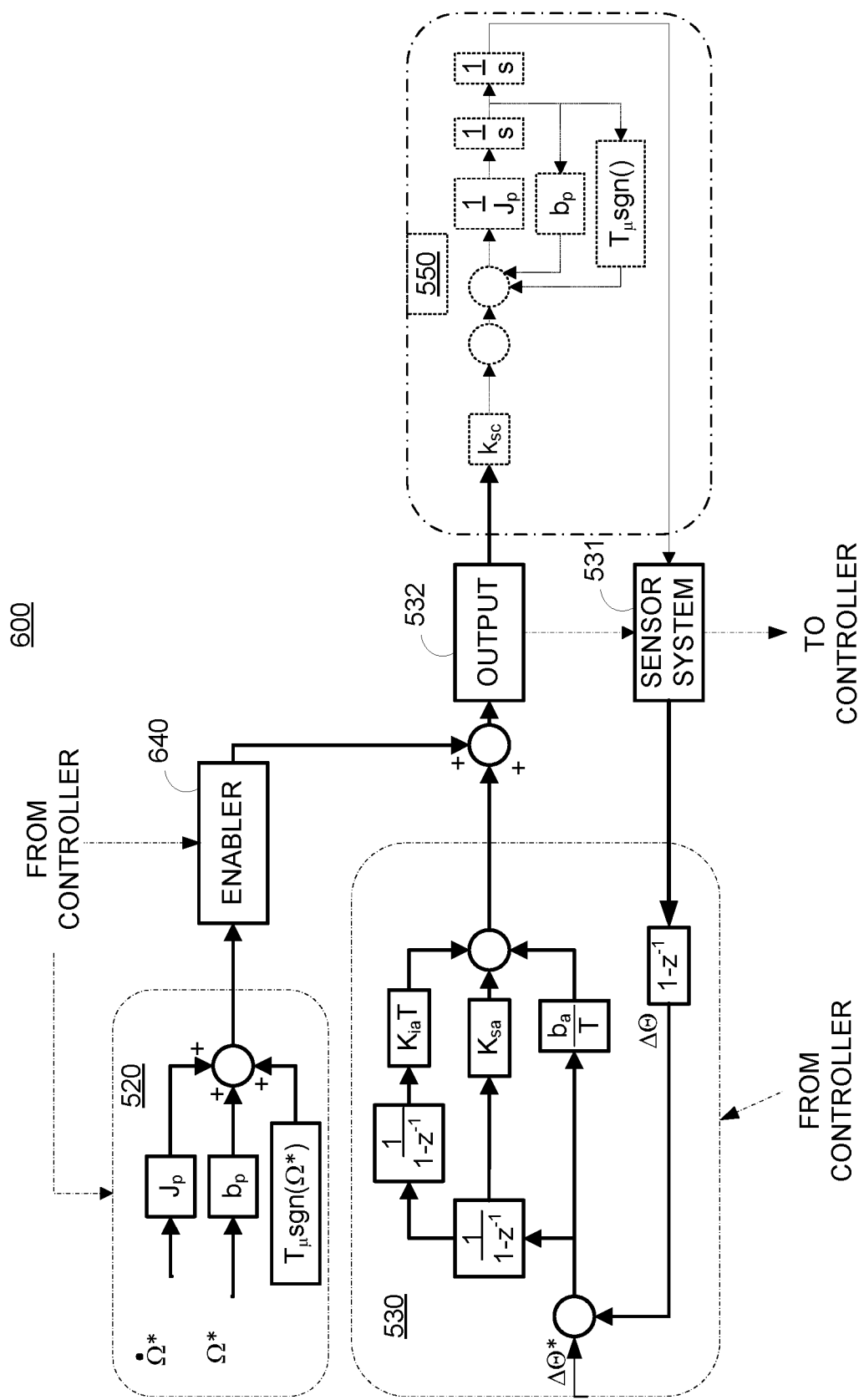
FIG. 6 shows a block diagram of an illustrative system for managing engagement of a motor and a load using an enabled/disabled feedforward controller, in accordance with some embodiments of the present disclosure.
Figure 7:
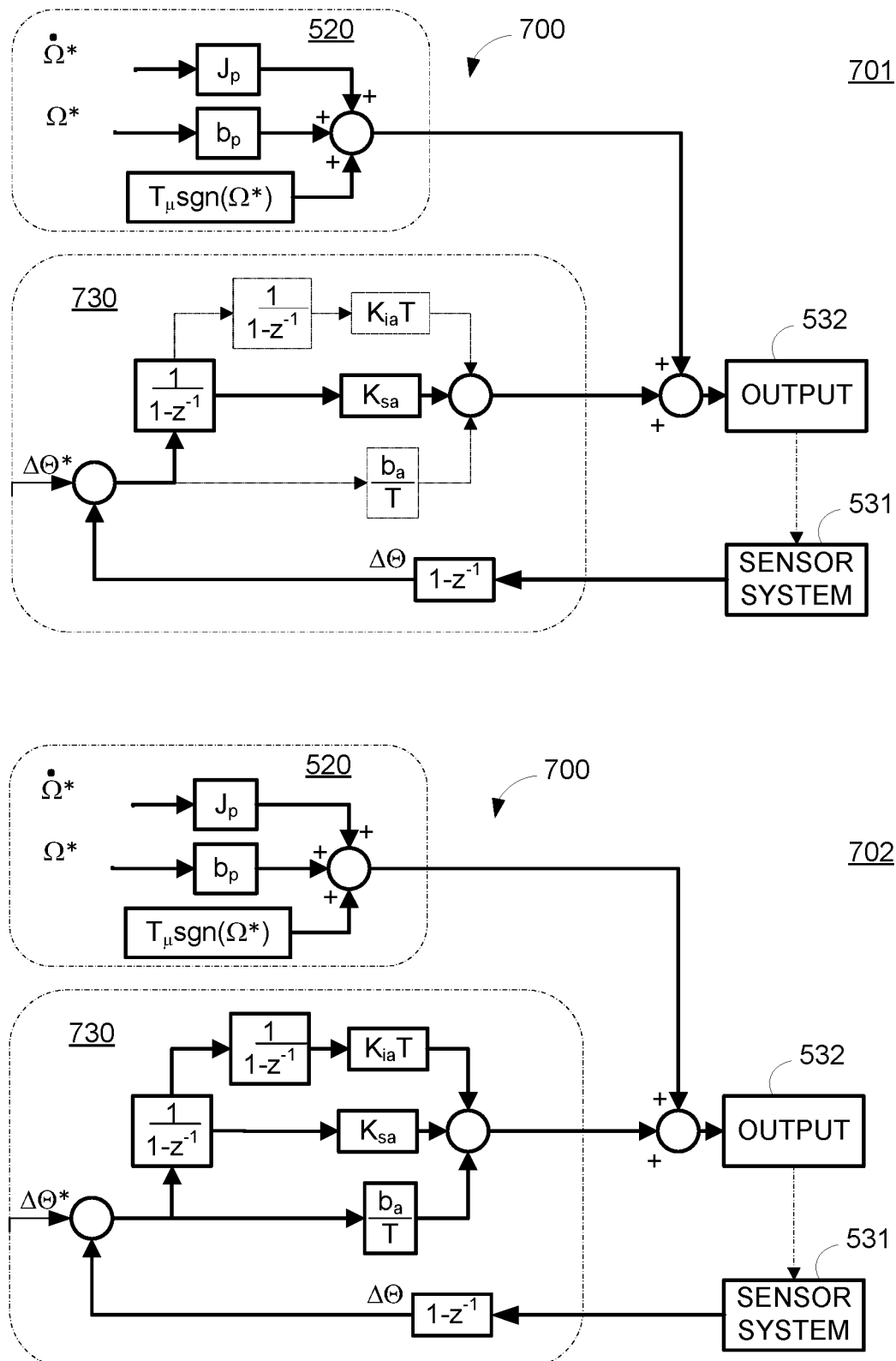
FIG. 7 shows a block diagram of an illustrative system for managing engagement of a motor and a load using a modified feedback controller, in accordance with some embodiments of the present disclosure.

FIGS. 5-7 show block diagrams of illustrative systems for managing engagement of a motor and a load. For example, the illustrative systems of FIGS. 5-7 may be configured to implement process 400 of FIG. 4, or any steps thereof. In a further example, the illustrative systems of FIGS. 5-7 may be implemented by system 300 of FIG. 3, or any suitable portions thereof.

FIG. 5 shows a block diagram of illustrative system 500 for managing engagement of a motor and a load using an indexed feedforward controller, in accordance with some embodiments of the present disclosure. As illustrated, system 500 includes controller 520, controller 530, modifier 540, output 532, sensor system 531, and a modeled plant 550 (e.g., indicative of an electric motor). In an illustrative example, a central controller (not illustrated) may provide inputs, control signals, or other information to components of system 500 for controlling the motor.

Controller 530, as illustrated, includes a PID controller, using position feedback (e.g., sampled position information as measured by sensor system 531). In an illustrative example, controller 530 may be, but need not be, the same as controller 330 of system 300 illustrated in FIG. 3. In some embodiments, for example, controller 530 may include gains (e.g., three gains as illustrated, corresponding to P, I, and D control), which may be, but need not be, adjustable. For example, in some embodiments, any or all gains may be set to zero, adjusted in value, enabled or disabled, or otherwise modified. For example, as illustrated, $\Delta\Theta^*$ is a desired change in angular position (e.g., per sample time step), $\Delta\Theta$ is a measured change in angular position (e.g., between the current angular position and the previous angular position), $1-Z^{-1}$ is a transform operator, $b_a$ is gain (e.g., for a proportional P term), $K_{sa}$ is a gain (e.g., for an integral I term), $K_{ia}$ is gain (e.g., for a derivative D term), T is a time step (e.g., inverse of sample frequency. Three terms (e.g., corresponding to a PID control scheme) are summed together at a summation block, the result of which corresponds to the output of the feedback controller (e.g., output of controller 530). As illustrated, sensor system 531 detects or senses one or more aspects of operation of plant 550, output 532, or both. In some embodiments, for example, an encoder is configured to sense angular position information (e.g., angular position, angular velocity, angular acceleration), and sensor system 531 may generate a feedback signal indicative of the position information. For example, as illustrated, sensor system 531 generates a sampled output indicative of a current angular position. Accordingly, as illustrated, control system 530 uses the sampled position information in implementing a feedback PID control scheme. Sensor system 531 may provide a continuous feedback signal, which may be sampled by controller 530 or another controller, or sensor system 531 may sample the position information and output a signal indicative of sampled position.

Controller 520, as illustrated, includes a feedforward controller. In an illustrative example, controller 520 may be, but need not be, the same as controller 320 of system 300 illustrated in FIG. 3. For example, as illustrated, $\Omega^*$ is a desired angular velocity, $J_P$ is gain (e.g., a moment of inertia, determined or based on reference information), $b_P$ is a gain (Viscous damping gain), $T_\mu$ is a gain (e.g., Coulomb friction gain to illustrate the torque when velocity crossing zero—transitioning between dynamic and static friction while the velocity switches directions) multiplied by the sign operator $sgn(\Omega)^*$) to match in direction to the desired torque. Three terms are summed together at a summation block, and the output of the summation block corresponds to the output of the feedforward controller (e.g., output of controller 520). In some embodiments, controller 520 is initiated during motor engagement (or disengagement), but otherwise need not be initiated. In some embodiments, controller 520 may be initiated at a first time with modifier 540 configured to null the output of the controller 520 until a second time. In some embodiments, controller 520 may be initiated and modifier 540 may be configured to provide a modified output for a duration or until a condition is met. Modifier 540 may be configured to receive control signals, control information, or both from a controller. For example, a central controller that monitors motor speed and load speed may generate and transmit a control signal to modifier 540 to control operation of modifier 540 (e.g., activation, de-activation, gain value, or a combination thereof). In a further example, sensor system 531 may generate and transmit a signal to modifier 540 to control operation of modifier 540 (e.g., activation, de-activation, gain value, or a combination thereof based on speed, current, or both).

Output 532 is configured to provide a signal indicative of current, torque, or both to the power electronics system for controlling the electric motor. As illustrated, the output of controller 520 is provided to modifier 540, which outputs a modified output. The modified output and the output of controller 530 are combined at a summation block, as illustrated, to generate the input to output 532. In some embodiments, output 532 may include a vector operation, a matrix operation, an algorithm for converting the input signal to an output signal, a signal generator configured to generate an electrical signal indicative of the input, any other suitable hardware or software components, or any combination thereof. In some embodiments, output 532 is configured to output a latched current command signal to power electronics of a motor driver. For example, the current command signal may include a PWM or PDM signal, a digital signal, an analog signal, any other suitable type of signal indicative of the current command, or any combination thereof. In some embodiments, output 532 may be implemented in control circuitry of a control system, a power electronics system, or a combination thereof. In some embodiments, output 532 may include a power electronics system. For example, the output of output 532 may include current flow in phase leads of phases of an electric motor (e.g., wherein plant 550 corresponds to the motor itself). It will be understood that output 532 may be configured to output a control signal for controlling power electronics, or may include power electronics and may be configured to output current in phase leads of the motor.

Sensor system 531 may be configured to sense, for example, position information (e.g., angular position, speed, or acceleration), current (e.g., in a DC bus, one or more motor phases, or a combination thereof), voltage (e.g., of a phase, across a shunt, of a DC bus line, across a component), temperature, any other suitable parameter or operating characteristic, or any combination thereof. Sensor system 531 may be configured to transmit information to memory, a controller, any other suitable receiver, or any combination thereof. For example, information from sensor system 531 may be provided to a central controller (e.g., central controller not illustrated in FIG. 5) that provides input, instructions, or both to controllers 520 and 530 and modifier 540. In a further example, sensor system 531 may provide position information to controller 530 to perform feedback control. In a further example, sensor system 531 may provide position information to controller 520, a central controller, modifier 540, or a combination thereof to activate/de-activate controller 520, provide instructions to modifier 540 (e.g., provide a value for modifying output of controller 520, instructions to activate/de-activate), any other suitable function, or any combination thereof. In some embodiments, sensor system 531 may generate a signal indicative of sensed values and transmit the signal to memory (e.g., a data queue) for use by one or more controllers, modifier 540, output 532, or a combination thereof. In some embodiments, sensor system 531 receives information indicative of current flow in output 532 (e.g., one or more phase currents, one or more DC bus currents, measured current, desired current, estimated current).

In an illustrative example, an electric motor may be initially disengaged from a drivetrain. A control system may determine that the electric motor is to be engaged and accordingly generates input values (e.g., desired position, speed, torque, current, any other parameter, or any combination thereof). The control signal may initialize controllers 520 and 530, and configure modifier 540 to modify the output of controller 520. Output 532 generates an output for controlling the electric motor (e.g., plant 550). In some embodiments, modifier 540 may be configured to function as a unit gain block, propagating the output of controller 520 directly. In some embodiments, modifier 540 is configured to function as a unit gain block until the sensed motor speed is within a predetermined range of the desired speed (e.g., within 1%, 5%, 10%, a predetermined difference in RPM, or any other suitable threshold). In some such embodiments, modifier 540 functions as a gain block with a gain of zero once the threshold is met (e.g., modifier 540 nulls the output of controller 520). Once the motor shaft speed (e.g., as detected by sensor system 531) reaches or sufficiently nears the desired speed, the control system may deactivate controller 520 and may maintain controller 530 to provide feedback control of the electric motor. In an illustrative example, modifier 540 may apply any suitable modification such as those described in the context of panel 450 of FIG. 4.

In a further illustrative example, the use of controller 520 improves the command tracking bandwidth of the control approach as compared to the use controller 530. For example, controller 530 may be softened (e.g., less stiff) and may exhibit a lesser bandwidth, and controller 520 may increase the overall stiffness of the control system (e.g., by an order of magnitude or more). To illustrate, while the softened feedback controller (e.g., controller 530) may exhibit a bandwidth of less than 10 Hz (e.g., 5 Hz), the use of a feedforward controller (e.g., controller 520) may increase bandwidth to over 100 Hz (e.g., 500 Hz). Thus, use of a modified output of the feedforward controller (e.g., by modifier 540) may help to prevent overshoot that may arise from the soft feedback controller and use of the feedforward controller together. In some embodiments, the output of controller 520 is larger than the output of controller 530. For example, the output of the feedforward controller may be an order of magnitude, or larger, than the output of the feedback controller.

FIG. 6 shows a block diagram of illustrative system 600 for managing engagement of a motor and a load using an enabled/disabled feedforward controller, in accordance with some embodiments of the present disclosure. In an illustrative example, a central controller (not illustrated) may provide inputs, control signals, or other information to components of system 600 for controlling the motor. As illustrated, system 600 includes controller 520, controller 530, and modeled plant 550 of FIG. 5, as well as enabler 640. Enabler 640 may be configured to allow or disallow the output from controller 520 from being propagated to output 532 (e.g., or otherwise combined with output from controller 530). In some embodiments, enabler 640 is configured to pass the output from controller 520 without modification when enabled, and is configured to prevent propagation of the output of controller 520 when disabled (e.g., or otherwise output a zero or null value). In some embodiments, enabler 640 is configured to allow the output of controller 520 to propagate from an initialization time until the motor shaft speed is within a threshold of the load speed, reaches the load speed, or otherwise determines to disable (e.g., based on any suitable criterion).

Enabler 640 may be configured to receive control signals, control information, or both from a controller. For example, a central controller that monitors motor speed and load speed may generate and transmit a control signal to enabler 640 to control operation of enabler 540 (e.g., activation, de-activation). In a further example, sensor system 531 may generate and transmit a signal to enabler 640 to control operation of enabler 640 (e.g., activation/de-activation based on speed, current, or both).

In an illustrative example, an electric motor may be initially disengaged from a drivetrain. A control system may determine that the electric motor is to be engaged and accordingly generates input values (e.g., desired position, speed, torque, current, any other parameter, or any combination thereof). The control signal may initialize controllers 520 and 530, and configure enabler 640 to enable the output of controller 520. Output 532 generates an output for controlling the electric motor (e.g., plant 550). In some embodiments, enabler 640 may be configured to propagate the output of controller 520 directly. In some embodiments, enabler 640 is configured to enable the output of controller 520 to propagate until the sensed motor speed is within a predetermined range of the desired speed (e.g., within 1%, 5%, 10%, a predetermined difference in RPM, or any other suitable threshold). In some such embodiments, enabler 640 disables the output of controller 520 from propagating once the threshold is met (e.g., enabler 640 nulls the output of controller 520). Once the motor shaft speed (e.g., as detected by sensor system 531) reaches or sufficiently nears the desired speed, the control system may deactivate controller 520 and may maintain controller 530 to provide feedback control of the electric motor. In an illustrative example, enabler 640 may be combined with modifier 540 to apply any suitable modification such as those described in the context of panel 450 of FIG. 4, and then enable or disable the modified signal from propagating. Thus, use of an enabler 640 for the output of the feedforward controller may help to prevent overshoot that may arise from use of the soft feedback controller and the feedforward controller together. In an illustrative example, the system may apply controller 520 until the motor speed is 90% of the load speed (e.g., or any other suitable fraction or percentage, which may be but need not be constant), and then disable controller 520 and allow controller 530 to provide feedback control. The motor speed, load speed, or both may be determined based on output of sensor system 531, which may be communicated to a central controller, controller 520, enabler 640, or a combination thereof.

FIG. 7 shows a block diagram of illustrative system 700 for managing engagement of a motor and a load using a modified feedback controller, in accordance with some embodiments of the present disclosure. As illustrated, system 700 includes controller 520, controller 730 (e.g., which is similar to controller 530 of FIGS. 5-6). Controller 730 includes one or more control terms (e.g., P, I, D, or a combination thereof), that are enabled/disabled, modified, added, removed, or otherwise altered to provide a change in control during engagement of an electric motor and a load. For example, configuration 701 corresponds to feedforward controller (e.g., controller 520) and a P controller (e.g., controller 530 configured with a proportional term). In some embodiments, controller 730 may initially include only a proportional term because, for example, accuracy need not be the primary concern during the engagement process. In some embodiments, the P controller is used until the motor speed is within a threshold of the load speed, and then the I and D terms of a PID controller are activated or otherwise enabled (e.g., as illustrated in configuration 702). In some embodiments, controller 730 adjusts the gains (e.g., $K_{ia}$, $K_{sa}$, and $b_a$) to provide feedback control. For example, any of the gains may be zeroed or otherwise nulled, adjusted in value, set to values according to an operating mode, or otherwise modified. As illustrated, in configuration 701, gains $K_{ia}$ and $b_a$ are zeroed, and then modified to a nonzero value in configuration 702 at a suitable time such as, for example, after engagement of the electric motor and the load, when the motor shaft speed is within a threshold of the load shaft speed, at a predetermined time during engagement, any other suitable time, or any combination thereof.

Figure 8:
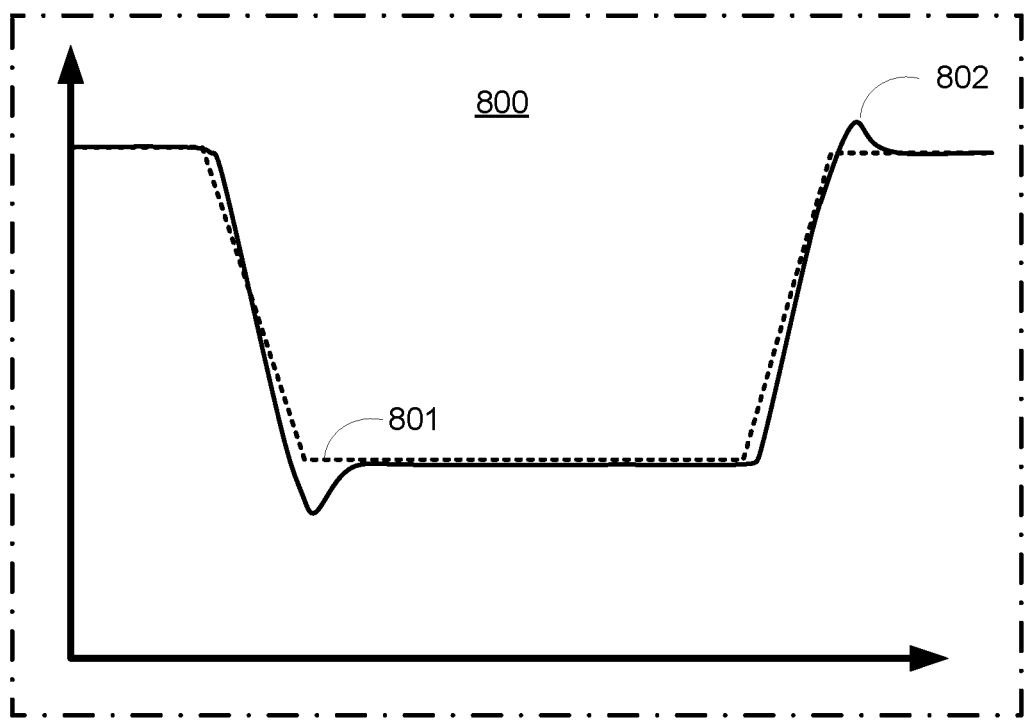
FIG. 8 shows plots of illustrative responses for a control system to a change in desired speed, in accordance with some embodiments of the present disclosure.
Figure 8:
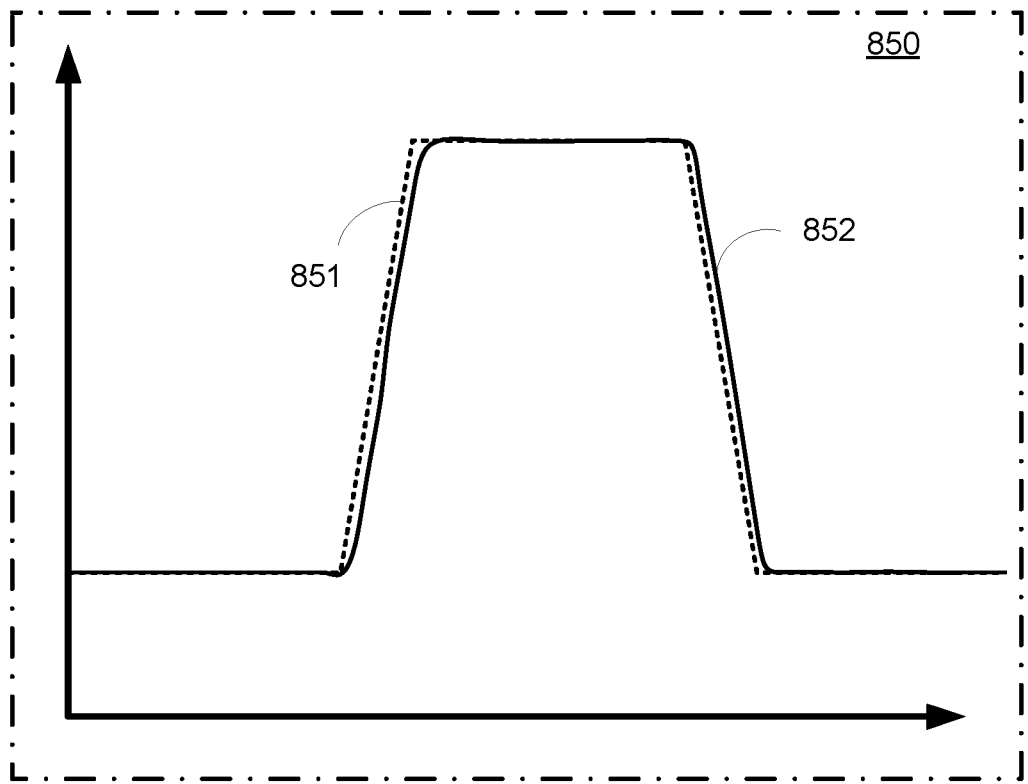

FIG. 8 shows plots 800 and 850 of illustrative responses for a control system to a change in desired speed, in accordance with some embodiments of the present disclosure. Plot 800 shows motor response for a system exhibiting overshoot (e.g., which as used herein, generally refers to both undershooting and overshooting unless described in a particular circumstance). Trace 801 corresponds to a desired speed of a motor shaft, and trace 802 corresponds to actual speed of the motor shaft. As illustrated, trace 801 exhibits a decrease in speed, a hold at the reduced speed, and then an increase in speed. As illustrated by trace 802, the system undershoots the reduced speed and then overshoots the increased speed. To illustrate, such overshoots may be caused by stiffness of a feedback controller, latency of the feedback controller, latency in feedback, feedforward control (e.g., too large a command), or a combination thereof. Such overshoots exhibited by trace 802 may, for example, cause the motor speed to be mismatched to the load speed and thus cause interaction torque. Further, such overshoots may stress mechanical components, lead to instability, increase the time required for engaging the electric motor to the load, or a combination thereof.

Plot 850 shows motor response for a system that mitigates overshoot in accordance with the present disclosure. Trace 851 corresponds to a desired speed of a motor shaft, and trace 852 corresponds to actual speed of the motor shaft. As illustrated, trace 851 exhibits an increase in speed, a hold at the increased speed, and then a decrease in speed. As illustrated by trace 852, the system follows the desired speed more closely than the system of plot 800, avoiding overshooting the increased desired speed or undershooting the decreased desired speed. To illustrate, such mitigation may be achieved by modifying a stiffness of the feedback controller, applying a feedforward controller, modifying the feedforward controller, enabling and disabling the feedforward controller, or a combination thereof. To illustrate, mitigating overshoots and undershoots may, for example, prevent or otherwise mitigate the motor speed from being mismatched to the load speed and thus causing interaction torque. Further, preventing or reducing overshoots and undershoots may prevent or otherwise mitigate stresses on mechanical components, instabilities, increases in the time required for engaging the electric motor to the load, or a combination thereof. For example, preventing overshoots and undershoots may allow more efficient engagement of the motor, faster engagement of the motor, more repeatable and/or predictable engagement of the motor, or a combination thereof.

Figure 9:
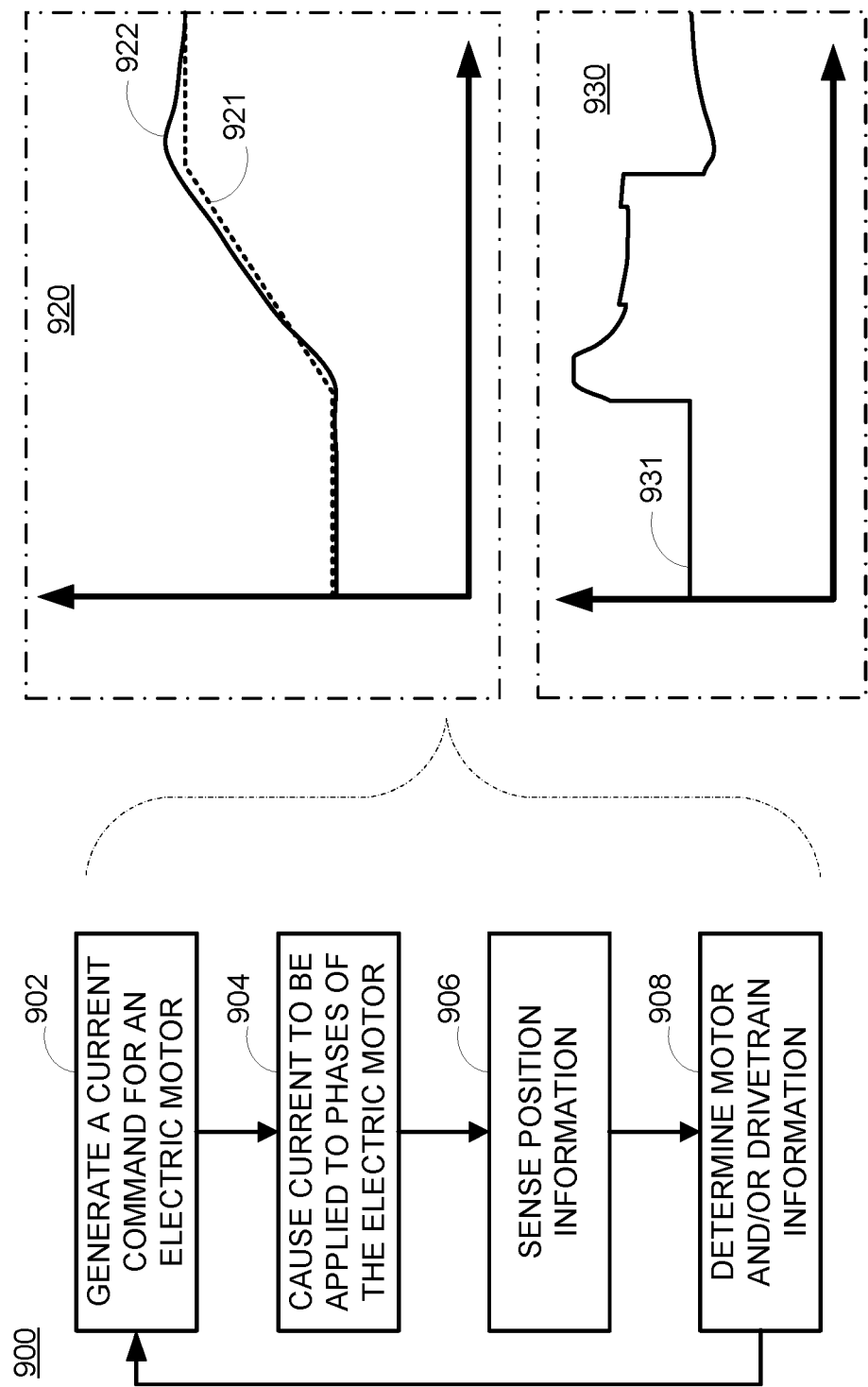
FIG. 9 shows a flowchart of an illustrative process for determining an inertia metric, in accordance with some embodiments of the present disclosure.

FIG. 9 shows a flowchart of illustrative process 900 for determining an inertia metric, in accordance with some embodiments of the present disclosure. Process 900 may be implemented by control system 250 of FIG. 2 or system 300 of FIG. 3 (e.g., interface controller 310 thereof), for example. Process 900 may be used to update or check a controller (e.g., or parameters used therein), perform a fault check (e.g., determine if a determined parameter agrees with a reference value), any other suitable purpose, or any combination thereof. In some embodiments, for example, process 900 is performed before, during, and/or after process 400 of FIG. 4 to tune parameters used in one or more controllers.

At step 902, the system generates a current command for an electric motor. In some embodiments, for example, step 902 includes process 400 of FIG. 4 or a portion thereof (e.g., steps 402-412 thereof). In some embodiments, step 902 includes one or more controllers (e.g., controllers 520 and 530 of FIGS. 5-6) generating a current command. The current command may include one or more current values corresponding to one or more electric motors, one or more phases of an electric motor, or a combination thereof. In some embodiments, the system may generate an output signal such as, for example, an analog signal, a PWM signal, a digital signal, any other suitable signal for transmission via any suitable communications path, or any combination thereof that is indicative of the current command. For example, the system may generate an output command indicative of a desired torque, desired current, or both, and may generate an output signal indicative of the output command for transmitting to a power electronics system (e.g., or control circuitry thereof). In some embodiments, the system may include a signal generator that is configured to take as input the output command and generate as output a signal for transmission that is indicative of the output command. In some embodiments, the system may latch the output such that a particular output continues to be transmitted until it is updated (e.g., by an iteration of the control algorithm or otherwise determining of a new output command).

At step 904, the system causes current to be applied to phases of the electric motor. In some embodiments, for example, steps 902 and 904 include process 400 of FIG. 4 (e.g., step 904 may include step 414 thereof). In some embodiments, the system may output a signal (e.g., a PWM signal, an analog signal, a digital signal) to power electronics (e.g., any suitable power electronics system such as power electronics 254) to control current in one or more phases of the electric motor (e.g., electric motor 210). In some embodiments, the power electronics system includes switches coupled to phases of the electric motor, wherein the switches are activated and deactivated to control current in the phases (e.g., and thus torque in the motor). For example, the power electronics system may include an inverter, a variable frequency drive, an H-bridge or half bridge, a DC bus, any other suitable components, or any combination thereof.

At step 906, the system senses position information of the electric motor. Position information may include, for example, an angular position, an angular change in position, an angular velocity, an angular acceleration, any other suitable position information for controlling a motor, or any combination thereof. For example, in some embodiments, the system receives a signal from a rotary encoder coupled to the motor shaft (e.g., or an intermediate shaft, drive shaft, or other shaft coupled to the motor shaft) and configured to sense angular position or changes thereof. The system may receive discreet position information or may sample position information at any suitable interval, for example. In some embodiments, the position information is stored in memory (e.g., memory 252 of control system 250 of FIG. 2).

At step 908, the system determines motor information, drivetrain information, or both, based at least in part on the position information of step 906. Motor information may include a torque, an inertia, electrical information, current information, information derived thereof, any other suitable information, or any combination thereof. In an illustrative example, the system may use the framework that applied torque is equal to the product of a moment of inertia of the system and the angular acceleration of the system. Accordingly, the system may determine or otherwise estimate the moment of inertia of the system based on the ratio of torque divided by angular acceleration. The torque may be measured, calculated based on the applied current (e.g., using torque constants or other reference information), or a combination thereof. The angular acceleration may be measured, included as part of the position information of step 906, determined from the position information of step 906, or a combination thereof. In a further example, the system may use the framework that angular momentum is equal to the product of a moment of inertia of the system and the angular velocity of the system. In a further example, the system may use the framework that work is equal to the product of the applied torque and the change in angular position of the motor shaft. In a further example, the system may use the framework that power is equal to the product of the applied torque and the angular velocity of the motor shaft. Accordingly, the system may determine the power based on the current and voltage applied to the electric motor (e.g., measured, estimated, or otherwise determined), and may determine the angular velocity as part of or derived from the position information of step 906.

The determined motor information of step 908 may be used to refine or otherwise modify one or more controllers (e.g., controllers 520 and 530 of FIGS. 5-6), or parameters thereof. For example, if a wheel or other portion of a drivetrain is changed, altered, replaced, damaged, or otherwise exhibits different physical properties, the system may use process 900 to identify the physical properties or changes therein. The system may determine the applied current, torque, or power and also may determine an angular position, speed, or acceleration and then estimate a new moment of inertia, friction coefficient, offset, any other suitable parameter affecting control of the motor, or any combination thereof. In some embodiments, for example, process 900 may be repeated, applied at an interval, or otherwise implemented at any suitable time. In some embodiments, process 900 may be used as part of a running determination or filter to update values of parameters at a suitable bandwidth. Process 900 may be applied to a disengaged motor, an engaged motor, or both, to determine respective motor information or drivetrain information. For example, the moment of inertia of the disengaged motor may be estimated to help a feedforward controller during engagement. In a further example, the moment of inertia of the drivetrain (e.g., including one or more wheels) may be estimated to help speed control of the system when the motor is engaged. In some embodiments, the system identifies the current configuration (e.g., motor only, motor engaged with drivetrain), and then determines a moment of inertia, a friction estimate, any other suitable parameter or coefficient used in control or a model, or any combination thereof.

Plot 920 shows illustrative traces of velocity over time. Trace 921 corresponds to a desired angular velocity and trace 922 corresponds to an actual angular velocity (e.g., exhibiting some overshoot here). Plot 930 shows trace 931, which corresponds to a torque command (e.g., measured, or determined based on current or electrical power). During the change in angular speed, the torque and angular acceleration may be measured or otherwise determined, and the system may estimate the moment of inertia of the rotary system (e.g., whether the motor is engaged or disengaged). Accordingly, when the system is holding a constant or otherwise very slow-changing angular speed, the torque required for that condition may be determined to estimate friction losses, mechanical losses, or other offsets or losses that a controller may take into account. For example, the system may determine the residual torque required to maintain a constant speed and, based on that residual torque, the system estimates or otherwise determines a friction metric, efficiency metric or other suitable metric. The system may implement process 900 before, during, and/or after implementing process 400 to tune parameters of the controllers, estimate parameter values, perform a fault check (e.g., to determine discrepancies), update stored reference information, or a combination thereof.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for managing motor engagement in a vehicle, the method comprising:
   determining to engage a disengaged motor shaft with a drivetrain;
   activating, in response to determining to engage the motor shaft, a feedback controller based on a speed of the motor shaft;
   activating, in response to determining to engage the motor shaft, a feedforward controller;
   determining at least one metric for modifying an output of the feedforward controller, wherein the at least one metric is based on the speed of the motor shaft and the desired speed;

generating a resulting motor command based on the feedback controller, the feedforward controller, and the at least one metric;

causing the motor shaft and the drivetrain to be engaged based on the speed of the motor shaft and the desired speed; and nulling at least one of the feedforward controller or the at least one metric based on the speed of the motor shaft and the desired speed.

2. The method of claim 1, wherein:

the at least one metric comprises an index ranging from an initial value to a zero value; and the at least one metric decreases in value from the initial value to the zero value as the speed of the motor shaft approaches the desired speed within a predetermined range.

3. The method of claim 1, wherein:

the at least one metric comprises one of a constant value or a zero value;

the at least one metric comprises the constant value while the difference between the speed of the motor shaft and the desired speed is greater than a reference value; and the at least one metric comprises the zero value when the difference between the speed of the motor shaft and the desired speed is less than the reference value.

4. The method of claim 1, wherein causing the motor shaft and the drivetrain to be engaged comprises at least one of:

determining a difference between the speed of the motor shaft and the desired speed and comparing the difference to a reference difference; or comparing the speed of the motor shaft to a predetermined value, wherein the predetermined value is based on the desired speed.

5. The method of claim 1, further comprising modifying the feedback controller to increase command tracking bandwidth after causing the motor shaft and the drivetrain to be engaged.

6. The method of claim 1, wherein generating the resulting torque command comprises:

modifying an output of the feedforward controller using the at least one metric to generate a modified signal; and combining the modified signal with an output of the feedback controller to generate the resulting motor command.

7. The method of claim 1, wherein generating the resulting motor command comprises applying the at least one metric as a gain to the output of the feedforward controller.

8. The method of claim 7, wherein nulling at least one of the feedforward controller or the at least one metric comprises:

determining a difference between the speed of the motor and the desired speed;

comparing the difference to a reference value; and causing the at least one metric to achieve a value of zero.

9. A system comprising:

a drivetrain comprising at least one wheel of a vehicle;

a motor comprising a motor shaft and configured to be engaged with the drivetrain; and control circuitry configured to:

determine to engage the motor shaft and the drivetrain;

activate, in response to determining to engage the motor shaft, a feedback controller based on a speed of the motor shaft;

activate, in response to determining to engage the motor shaft, a feedforward controller;

determine at least one metric for modifying an output of the feedforward controller, wherein the at least one metric is based on the speed of the motor shaft and the desired speed;

generate a resulting motor command based on the feedback controller, the feedforward controller, and the at least one metric;

cause the motor shaft and the drivetrain to be engaged based on the speed of the motor shaft and the desired speed; and null at least one of the feedforward controller or the at least one metric based on the speed of the motor shaft and the desired speed.

10. The system of claim 9, wherein:

the at least one metric comprises an index ranging from an initial value to a zero value; and the at least one metric decreases in value from the initial value to the zero value as the speed of the motor shaft approaches the desired speed within a predetermined range.

11. The system of claim 9, wherein:

the at least one metric comprises one of a constant value or a zero value;

the at least one metric comprises the constant value while the difference between the speed of the motor shaft and the desired speed is greater than a reference value; and the at least one metric comprises the zero value when the difference between the speed of the motor shaft and the desired speed is less than the reference value.

12. The system of claim 9, wherein the control circuitry is configured to cause the motor shaft and the drivetrain to be engaged by at least one of:

determining a difference between the speed of the motor shaft and the desired speed and comparing the difference to a reference difference; or comparing the speed of the motor shaft to a predetermined value, wherein the predetermined value is based on the desired speed.

13. The system of claim 9, wherein the control circuitry is configured to modify the feedback controller to increase command tracking bandwidth after causing the motor shaft and the drivetrain to be engaged.

14. The system of claim 9, wherein the control circuitry is configured to generate the resulting torque command by:

modifying an output of the feedforward controller using the at least one metric to generate a modified signal; and combining the modified signal with an output of the feedback controller to generate the resulting motor command.

15. The system of claim 9, wherein the control circuitry is configured to apply the at least one metric as a gain to the output of the feedforward controller.

16. The system of claim 15, wherein the control circuitry is configured to null at least one of the feedforward controller or the at least one metric by:

determining a difference between the speed of the motor and the desired speed;

comparing the difference to a reference value; and causing the at least one metric to achieve a value of zero.

17. The system of claim 9, further comprising a sensor system coupled to the control circuitry and configured to sense position information corresponding to the motor shaft.

18. A method for managing engagement of a motor in a vehicle, the method comprising:

executing a feedback speed controller based on a speed of the motor shaft;

executing a feedforward torque controller based on a desired speed and the speed of the motor shaft;

causing the motor shaft and the drivetrain to be engaged based on a first threshold and speed of the motor shaft;

nulling the feedforward torque controller based on a first threshold and speed of the motor shaft; and modifying the feedback speed controller after the speed of the motor shaft and the desired speed are within the predetermined range.

19. The method of claim 18, further comprising:

generating a control signal based on output of the feedback controller and based on the feedforward controller; and causing a current to be generated in the motor based on the control signal.

20. The method of claim 18, wherein modifying the feedback controller comprises adjusting one or more constants of a PID controller.

\* \* \* \* \*